(12) United States Patent
Pipher et al.

(10) Patent No.: US 7,327,722 B1
(45) Date of Patent: Feb. 5, 2008

(54) BRIDGING ROUTED ENCAPSULATION

(75) Inventors: Matthew Pipher, Belle Mead, NJ (US); Kevin W. McGrattan, Waltham, MA (US)

(73) Assignee: Cisco Technology, Inc., San Jose, CA (US)

( * ) Notice: Subject to any disclaimer, the term of this patent is extended or adjusted under 35 U.S.C. 154(b) by 1122 days.

(21) Appl. No.: 10/293,081

(22) Filed: Nov. 13, 2002

(51) Int. Cl.
*H04L 12/56* (2006.01)
*H04L 12/28* (2006.01)

(52) U.S. Cl. .............. 370/352; 370/329; 370/392; 370/401; 370/475

(58) Field of Classification Search ........... 370/356, 370/359, 389, 392, 397, 399, 395.3, 395.31, 370/401; 379/352, 329
See application file for complete search history.

(56) References Cited

U.S. PATENT DOCUMENTS

| | | | |
|---|---|---|---|
| 4,794,594 A | 12/1988 | Picard | |
| 5,884,043 A | 3/1999 | Teplitsky | |
| 6,044,081 A | 3/2000 | Bell et al. | |
| 6,345,051 B1 | 2/2002 | Gupta et al. | |
| 6,741,575 B1 * | 5/2004 | Zhang et al. | 370/329 |
| 6,747,979 B1 * | 6/2004 | Banks et al. | 370/401 |
| 6,807,172 B1 * | 10/2004 | Levenson et al. | 370/389 |
| 6,842,453 B1 * | 1/2005 | Kloth et al. | 370/392 |
| 2004/0109460 A1 * | 6/2004 | Banks et al. | 370/401 |
| 2005/0276265 A1 * | 12/2005 | Serna et al. | 370/390 |

OTHER PUBLICATIONS

Plummer, D., An Ethernet Address Resolution Protocol, Request for Comments 826, Network Working Group, Internet Engineering Task Force, http://www.ietf.org, Nov. 1982, pp. 1-10.
Heinanen, J., Multiprotocol Encapsulation Over ATM Adaption Layer 5, Request for Comments 1483, Network Working Group, Internet Engineering Task Force, http://www.ietf.org, Jul. 1993, pp. 1-16.
Grossman, D., et al., Multiprotocol Encapsulation Over ATM Adaption Layer 5, Request for Comments 2684, Network Working Group, Internet Engineering Task Force, http://www.ietf.org, Sep. 1999, pp. 1-23.
RFC1483 Bridging Baseline Architecture, Cisco Systems Incorporated, (c) 1992-2000, pp. 1-5.
Configuring Bridged-Style PVCs on ATM Interfaces in the GSR and 7500 Series, Cisco Systems Incorporated, (c) 1992-2002, pp. 1-9.
Routed Bridged Encapsulation Baseline Architecture, Cisco Systems Incorporated, (c)1992-2001, pp. 1-11.
Bridged PVC Connection Between a Router and a Catalyst Switch, Cisco Systems Incorporated, (c) 1992-2002, pp. 1-5.
Welcher, P., Integrated Routing and Bridging, Mentor Technologies, (c) 1997, pp. 1-5.

* cited by examiner

*Primary Examiner*—Binh K. Tieu
(74) *Attorney, Agent, or Firm*—Cesari and McKenna LLP

(57) ABSTRACT

A technique for forwarding packets. An intermediate node assigns a link-layer address to an interface. Packets that specify the link-layer address as the destination address are processed and forwarded over the interface towards a destination. Packets received on the interface are processed including specifying the link-layer address as the source address of the packet and forwarded towards a destination specified in the packet.

20 Claims, 7 Drawing Sheets

400 →

| VIRTUAL LINK LAYER ADDRESS 425 | NETWORK LAYER ADDRESS 435 | LINK LAYER ADDRESS 440 | CONNECTION INFORMATION 495 |
|---|---|---|---|

| DESTINATION ADDRESS 510 | SOURCE ADDRESS 520 | LENGTH 530 | DATA 540 | FCS 550 |
|---|---|---|---|---|

| HARDWARE TYPE 605 | | PROTOCOL TYPE 610 |
|---|---|---|
| HARDWARE ADDRESS LENGTH 615 | PROTOCOL ADDRESS LENGTH 620 | OPERATION 625 |
| SOURCE HARDWARE ADDRESS 630 | | |
| SOURCE PROTOCOL ADDRESS 635 | | |
| DESTINATION HARDWARE ADDRESS 640 | | |
| DESTINATION PROTOCOL ADDRESS 645 | | |

FIG. 6

BRIDGING ROUTED ENCAPSULATION

BACKGROUND OF THE INVENTION

1. Field of the Invention

The present invention relates to data networks and specifically to the forwarding of packets in computer networks.

2. Background Information

A computer network is a geographically distributed collection of interconnected communication links for transporting data between nodes, such as computers. Types of computer networks range from local-area networks (LANs) to wide-area networks (WANs). LANs are computer networks comprising e.g., Ethernet links that typically connect nodes in the same general physical location, usually within a building or a campus, whereas WANs are computer networks comprising e.g., Asynchronous Transfer Mode (ATM) links that typically connect nodes over a large geographical area.

Communication among the nodes of a network is typically effected by exchanging discrete protocol data units (PDUs), such as packets or frames, between the communicating nodes according to a hierarchical model of predefined protocols. The hierarchical model often used is based on the Open Systems Interconnection (OSI) reference model of hierarchical communication. This model is comprised of seven-layers where each layer is defined by the set of functions it performs and the services it provides.

Nodes within a LAN often communicate with one another at the link layer, which is Layer 2 (L2) of the OSI reference model. The link layer is concerned with physical addressing, network topology, line discipline, link error checking, ordered delivery of link-layer packets (bridged PDUs), and link flow control to ensure the packets are reliably transferred across a link, such as a physical connection between two end nodes. A bridged PDU typically comprises a link-layer header, containing L2 addressing information, and data. LANs are often connected to one another through a bridge, which is a network device that enables packets to be transferred from one LAN to another.

In networks where communication at the link layer may not be possible, nodes often communicate with one another at the network layer or Layer 3 (L3) of the OSI reference model. The network layer provides connectivity and path selection between two end nodes. Routing protocols residing in the network layer select optimal paths through a series of interconnected networks based on the destination network address. Individual network-layer protocols then move data, commonly called network-layer packets (routed PDUs), in accordance with the network-layer protocol along these paths. A routed PDU typically comprises a network-layer header, containing L3 address information, and data. L2 addressing information is typically not included in a routed PDU.

Networks that employ different technologies to effect communication between the nodes in the network are often called hybrid networks. For example, a network that comprises both an ATM infrastructure and an Ethernet infrastructure that are used to effect communication among various nodes in the network is often called a hybrid Ethernet-ATM network. The ability to translate between two or more dissimilar technologies for the purpose of achieving effective interoperability is commonly called interworking. For example, the above-described hybrid Ethernet-ATM network may contain a network device that connects the ATM infrastructure with the Ethernet infrastructure and is configured to interwork the two infrastructures such that data can be exchanged between them.

In some hybrid networks, geographically dispersed LANs are connected to one another through a WAN via a connection, such as an ATM virtual connection (VC). Typically, packets passed over the connection are encapsulated at a sending end (node) of the connection, transferred over the connection in encapsulated form, then decapsulated at a receiving end of the connection, in accordance with an encapsulation protocol. One encapsulation protocol commonly used to encapsulate packets transferred over ATM VCs is the Multiprotocol Encapsulation Over ATM Adaptation Layer 5 protocol described in Request For Comments (RFC) 1483 and RFC 2684 (hereinafter referred to as "RFC 2684"), which is available from the Internet Engineering Task Force (IETF), http://www.ietf.org, and is hereby incorporated by reference as though fully set forth herein. RFC 2684 can be used to encapsulate both bridged and routed PDUs to enable the transfer of link-layer and network-layer packets, respectively. As used herein, bridged and routed encapsulation refers to the technique of encapsulating bridged and routed PDUs, respectively.

FIG. 1 is an example of a hybrid network 100 that employs RFC 2684 routed encapsulation to transfer PDUs from one LAN to another LAN over a VC. Network 100 comprises two geographically dispersed LANs 120a, 120b interconnected through intermediate nodes, such as routers 130a, 130b, and a WAN 140 comprising a plurality of additional intermediate nodes 145 that make up e.g., an ATM cloud. In particular, virtual connection (VC) 170 provides a point-to-point "logical" connection that connects router 130a with router 130b through WAN 140. Moreover, routers 130a and 130b are configured to send and receive packets over VC 170 in accordance with RFC 2684 encapsulation. For example, a network-layer packet sent from node 110a to node 110d is forwarded to router 130a which, in turn, encapsulates the packet in accordance with RFC 2684 routed encapsulation, and forwards the encapsulated packet over VC 170 to router 130b. Router 130b receives the packet, decapsulates it, and forwards it over LAN 120b to node 110d. Likewise, a link-layer packet sent from node 110a to node 110d is handled in a similar manner except that it is processed in accordance with RFC 2684 bridged encapsulation instead of RFC 2684 routed encapsulation.

One problem with many encapsulation techniques is that they are not interchangeable. For example, the bridged and routed encapsulation techniques described in RFC 2684 are not interchangeable in the sense that a packet encapsulated using one technique, e.g., routed encapsulation, cannot be decapsulated using the other technique, e.g., bridged encapsulation. Thus, for example, if routers 130a and 130b are configured to encapsulate packets according to RFC 2684 routed encapsulation, if either router is reconfigured to encapsulate packets using RFC 2684 bridged encapsulation, the other router must also be reconfigured.

Another problem with some encapsulation techniques is that the encapsulated packet may not contain sufficient information to enable the PDU contained in the packet to be properly forwarded. For example, suppose router 130a is reconfigured as an Ethernet attached router adapted to communicate at the link layer via link-layer packets with node 145a. In addition, assume that the endpoint of VC 170 extends from router 130b, which is configured as an ATM attached router, to node 145a, which is configured as a L2 switch. Moreover, assume router 130b has a routed interface associated with VC 170 that is configured to handle RFC 2684 routed-encapsulated packets, containing network-layer address information, over the connection. One problem with this configuration is that routed-encapsulated packets originating from router 130b, transferred over VC 170 to L2 switch 145a and destined for router 130a do not carry the necessary link-layer (L2) address information needed to switch the packets at the L2 switch 145a to router 130a. One way to deal with this problem is to encapsulate the packets at router 130b using RFC 2684 bridged encapsulation, however, doing so would necessitate reconfiguring router 130b to handle RFC 2684 bridged encapsulation. In arrangements where the routers are maintained by an entity that is different than the entity providing the wide-area network, such as a customer/service provider arrangement, having to reconfigure both routers may not be desirable.

SUMMARY OF THE INVENTION

Briefly, the present invention relates to a technique for forwarding packets received at an intermediate node over a hybrid network. The intermediate node has a first interface (link-layer connection) connected to e.g., a multi-access network, and configured to accommodate link-layer packets and a second interface (routed-encapsulated connection) connected to e.g., a point-to-point network, and configured to accommodate routed-encapsulated packets. Notably, the intermediate node assigns a link-layer address to the second interface. Preferably, this link-layer address is allocated from a pool of such addresses associated with the second interface. Link-layer packets received by the first interface having a destination address that matches the allocated link-layer address are encapsulated and forwarded over the second interface. Likewise, packets received by the second interface are processed, including decapsulating the packet and placing the allocated link-layer address and a link-layer address associated with the destination in the source address and destination address fields of the packet, respectively. The packet is then forwarded towards its destination.

In the illustrated embodiment, the hybrid network is a hybrid Ethernet-ATM network and the intermediate node is configured to accommodate link-layer and routed-encapsulated packets. A first router of the hybrid network is connected to a second router through a wide-area network (WAN). The intermediate node, which is illustratively a Layer 2 (L2) switch, is connected to the first router via a multi-access link-layer connection and the second router via a point-to-point virtual connection (VC). The first router learns the allocated link-layer address associated with the VC by sending an Address Resolution Protocol (ARP) request message to the switch. The switch, in turn, responds with an ARP reply message containing the allocated link-layer address. The link-layer address is then used by the first router to address packets destined for the second router. Packets received by the switch containing a destination address that matches the allocated is link-layer address are encapsulated according to a routed encapsulation technique and forwarded over the VC to the second router. Likewise, packets received by the switch over the VC from the second router that are destined for the first router are processed, including specifying the allocated link-layer address as the source address of the packet, and forwarded to the first router.

The inventive technique can be used in hybrid networks where a first node is connected to the network at the link layer and a second node is connected to the network at the network layer. The first node sends link-layer packets towards the second node, which is configured to receive and decapsulate packets according to a routed-encapsulated technique. Likewise, the second node sends routed-encapsulated packets not containing L2 addressing information to the first node, which is configured to receive packets at the link-layer. Advantageously, in accordance with the inventive technique, the packets can be transferred between the nodes without having to encapsulate the packets according to a bridged encapsulation technique, thereby, obviating having to reconfigure the second node.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 4 is a schematic block diagram of a connection table entry that can be used with the present invention;

FIG. 5 is a schematic block diagram of a link-layer frame that can be used with the present invention;

FIG. 6 is a block diagram of an Address Resolution Protocol (ARP) message that can be used with the present invention;

DETAILED DESCRIPTION OF AN ILLUSTRATIVE EMBODIMENT

Figure 1:
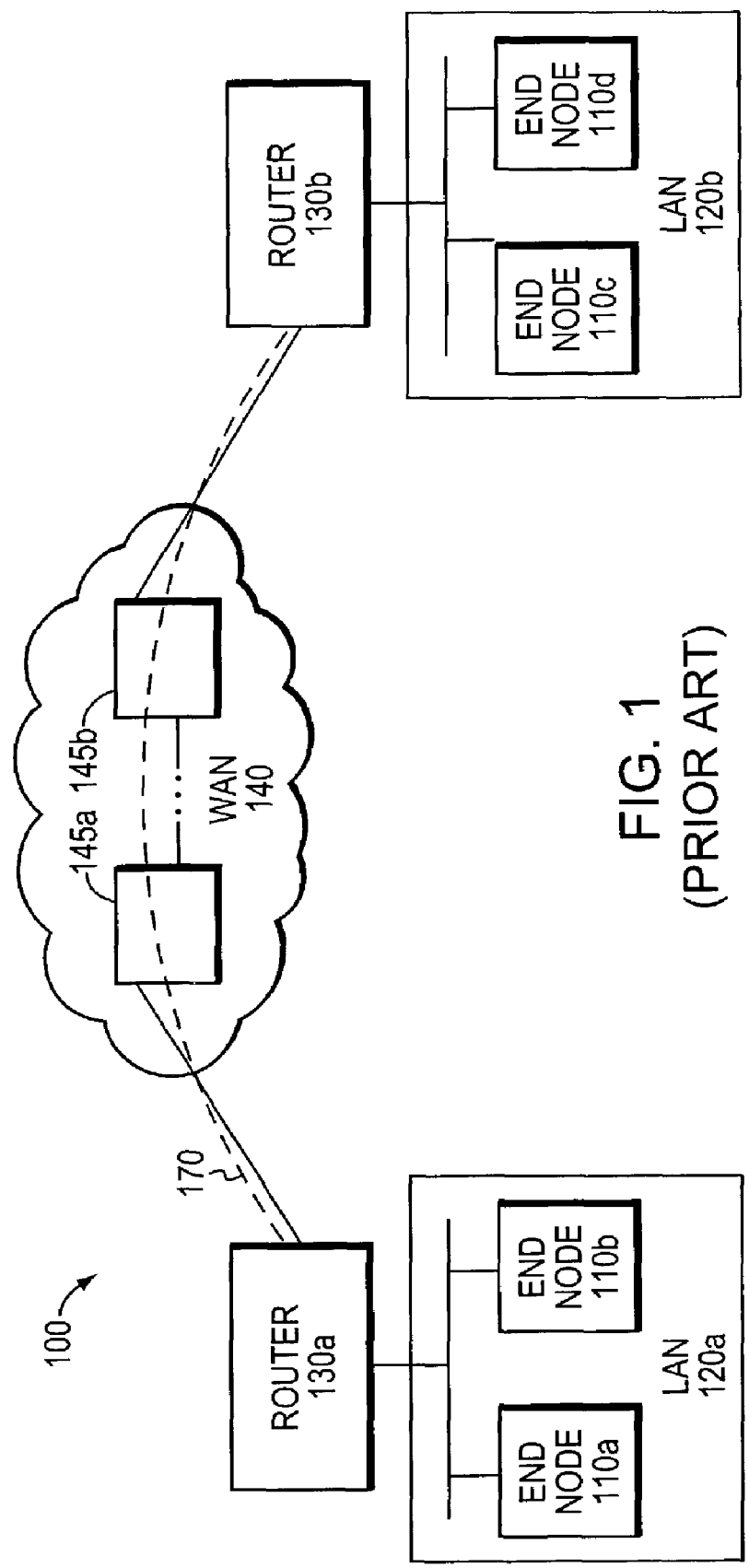
FIG. 1 is a schematic block diagram of a network comprising Local-Area Networks (LANs) connected via a Wide-Area Network (WAN)
Figure 2:
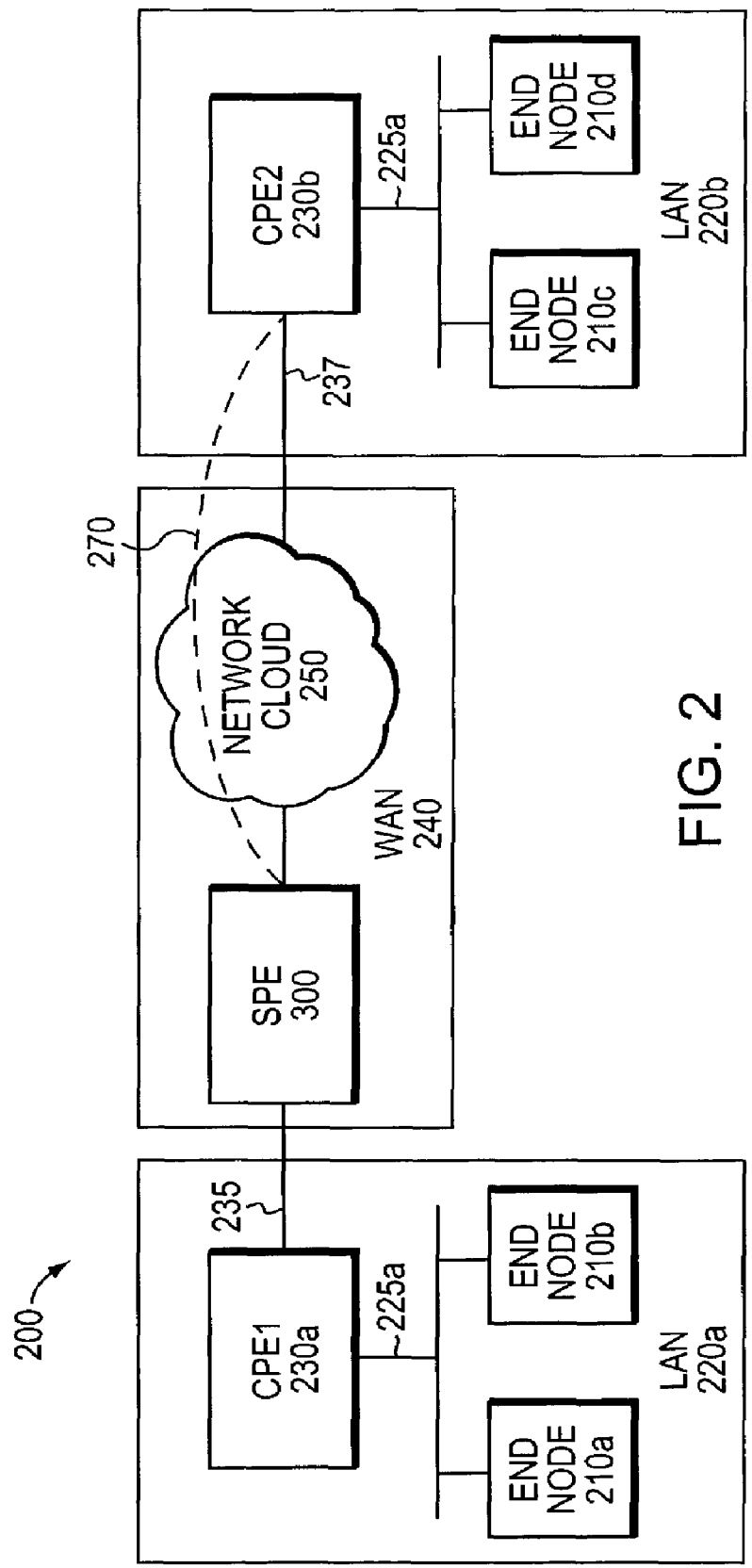
FIG. 2 is a schematic block diagram of a computer network that may be used with the present invention.

FIG. 2 is a schematic block diagram of a computer network 200 that can be used advantageously with the present invention. Network 200 comprises a collection of local-area networks (LANs) 220 coupled via a wide-area network (WAN) 240. Each LAN 220 comprises various end nodes 210 coupled to an intermediate node CPE1, CPE2 230a, 230b through a bus 225. Moreover, intermediate nodes 230, which are illustratively routers, couple the LANs 220 to WAN 240 through multi-access link 235 and point-to-point link 237, which illustratively are Ethernet and Asynchronous Transfer Mode (ATM) links, respectively. WAN 240 comprises an intermediate node 300 coupled to an ATM network cloud 250. Further, virtual connection (VC) 270 is a point-to-point virtual connection that couples intermediate node 300 through the network cloud 250 with router 230b.

Figure 3:
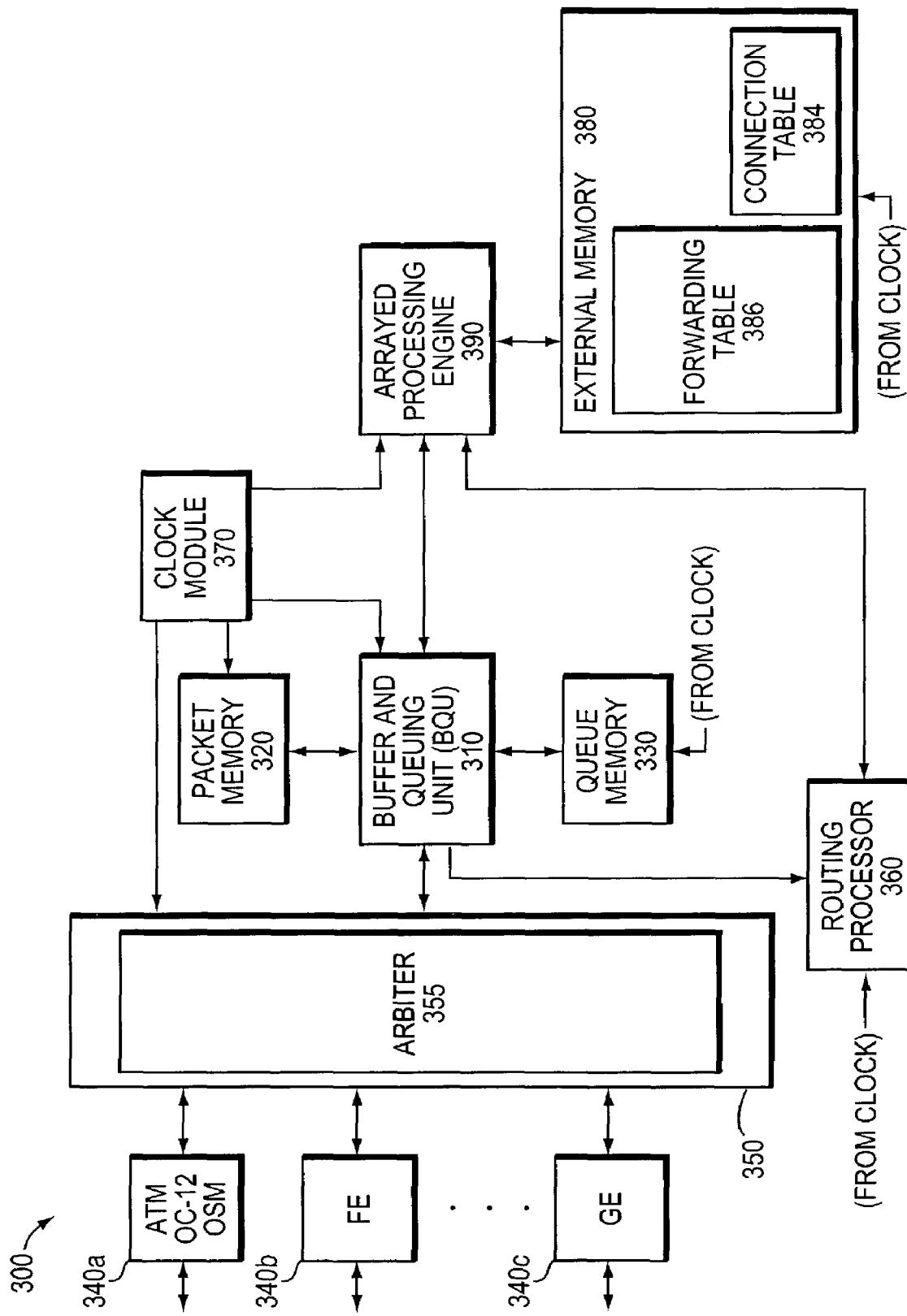
FIG. 3 is a high-level schematic block diagram of an intermediate node that may implement the present invention.

FIG. 3 is a high-level schematic block diagram of intermediate node (SPE) 300, which illustratively is a switch. An example of a switch that may be advantageously used with the present invention is the Cisco 7600 Series Internet Router available from Cisco Systems Incorporated, San Jose, Calif. Operation of SPE 300 will be described with respect to Internet Protocol (IP) routing and Ethernet bridging of packets, although SPE 300 may be programmed for other applications, such as encryption.

SPE 300 comprises a plurality of interconnected components including an arrayed processing engine 390, various memories, queuing logic 310, and network interface cards (line cards) 340. Operations of these components are preferably synchronously controlled by a clock module 370 although the arrayed elements of the processing engine may be operatively configured to function asynchronously. In the illustrative embodiment, the clock module 370 generates clock signals at a frequency of, e.g., 200 megahertz (i.e., 5 nanosecond clock cycles), and globally distributes them via clock lines to the components of the intermediate node.

The memories generally comprise random-access memory storage locations addressable by the processing engine and logic for storing software programs and data structures accessed by the components. An operating system, portions of which are typically resident in memory and executed by the arrayed processing engine, functionally organizes the node 300 by, inter alia, invoking network operations in support of software processes executing on node 300. It will be apparent to those skilled in the art that other memory means, including various computer readable media, may be used for storing and executing program instructions pertaining to the inventive technique and mechanism described herein.

A buffer and queuing unit (BQU) 310 is connected to a packet memory 320 for storing packets and a queue memory 330 for storing network-layer and link-layer headers of the packets on data structures, such as linked lists, organized as queues. The BQU 310 further comprises data interface circuitry for interconnecting the processing engine with a plurality of line cards 340 via a selector circuit 350 having an arbiter 355. The line cards 340 may comprise, e.g., Asynchronous Transfer Mode (ATM), Fast Ethernet (FE) and Gigabit Ethernet (GE) ports, each of which includes conventional interface circuitry that may incorporate the signal, electrical and mechanical characteristics, and interchange circuits, needed to interface with the physical media and protocols running over that media. In the preferred embodiment, one of the line cards 340a is an ATM OC-12 Optical Services Module (OSM), available from Cisco Systems Incorporated, configured to terminate VC 270 at node 300.

A routing processor 360 executes conventional routing protocols for communication directly with the processing engine 390. The routing protocols generally comprise topological information exchanges between intermediate nodes to determine preferred paths through the network based on, e.g., destination IP addresses. These protocols provide information used by the processor 360 to create and maintain forwarding tables. The tables are loaded into the external partitioned memories 380 as forwarding information base (FIB) tables, such as forwarding table 386, used by the processing engine to perform, e.g., L2 and L3 forwarding operations. When processing a header in accordance with IP routing, for example, the engine 390 determines where to send the packet by indexing into the FIB using an IP address of the header. Execution of the forwarding operations results in destination media access control (MAC) addresses of the headers being rewritten by the processing engine to identify output ports for the packets.

The processing engine 390 may comprise a symmetric multiprocessor system having a plurality of processors (not shown). Each processor is illustratively a pipelined processor that includes, inter alia, a plurality of arithmetic logic units (ALUs) and a register file having a plurality of general purpose registers that store intermediate result information processed by the ALUs. The processors may be arrayed into multiple rows and columns, and further configured as a multi-dimensioned systolic array. In the illustrative embodiment, the processors are arrayed as eight (8) rows and two (2) columns in an 8×2 arrayed configuration that is embedded between an input buffer (not shown) and an output buffer (not shown). However, it should be noted that other arrangements, such as 4×4 or 8×1 arrayed configurations, might be advantageously used with the present invention. As noted herein, a single processor supporting multiple threads of execution can take advantage of the invention.

The processors of each row are configured as a "pipeline" to sequentially execute operations on the transient data, whereas the processors of each column operate in parallel to perform substantially the same operation on the transient data, but with a shifted phase. Each phase comprises a predetermined period of cycles, e.g., 128 cycles. Sequencing circuitry controls the processors of each pipeline by ensuring that each processor completes processing of current transient data before loading new transient data into the pipeline at a new phase. In general, a new phase of processing is started, i.e., a context switch is performed, when all of the processors finish processing their current context and new, incoming context is completely received.

The arrayed processing engine 390 is coupled to a memory partitioned into a plurality of external memory (Ext Mem) resources 380 which are preferably organized as one or more banks and implemented using fast-cycle-random-access-memory (FCRAM) devices, although other devices, such as reduced-latency-dynamic-random-access-memory (RLDRAM) devices, could be used. The external memory stores non-transient data organized as a series of data structures for use in processing the transient data. These data structures include forwarding table 386 and a connection table 384. Preferably, each of these data structures is organized as a table comprising one or more entries.

Forwarding table 386 holds information that is used by processing engine 390 to identify the interface (e.g., port, virtual connection) through which various nodes can be reached. Each entry contained in forwarding table 386 is associated with a particular node and contains, inter alia, the network-layer and link-layer address associated with the node, and the interface through which the node can be reached.

The connection table 384 contains information about connections on node 300. Each entry in table 384 is associated with connections, such as VC 270 and connection 235, and contains information about the connections. In the illustrated embodiment, information contained in this table is pre-configured and the table is indexed by a virtual-channel descriptor (VCD) associated with the connection. FIG. 4 is a block diagram of a connection-table entry that can be used with the present invention. Entry 400 comprises a virtual-link-layer-address field 425, a network-layer-address field 435, a link-layer-address field 440, and a connection-information field 495. The connection-information field 495 holds information associated with the connection, such as, e.g., an ATM port, ATM sub-interface, virtual path identifier (VPI), virtual channel identifier (VCI), and virtual channel descriptor (VCD).

The virtual-link-layer-address field 425 holds a link-layer address assigned to the routed-encapsulated connection, e.g., VC 270. As described below, this link-layer address is used to "spoof" the link-layer address of nodes reachable through the associated connection. Preferably, this address is allocated from a pre-configured pool of link-layer addresses associated with the line card that terminates the connection. The network-layer-address field 435 holds a network-layer address associated with a node, e.g., CPE2 230b that is reachable via the routed-encapsulated connection and the link-layer-address field 440 holds a link-layer address of a node, e.g., CPE1 230a, reachable through the bridged connection. For example, a connection table entry 400 associated with VC 270 and connection 235 contains a link-layer address associated with VC 270 in the virtual-link-layer-address field 425, the network-layer address associated with router 230b in the network-layer-address field 435, the link-layer address associated with router 230a in the link-layer-address field 440, and the ATM port, ATM sub-interface, VPI, VCI, and VCD associated with VC 270 in the information field 495.

Typically, communication between nodes is effected at the link layer using link-layer frames (packets). FIG. 5 is a partial schematic block diagram of a link-layer Ethernet frame, in accordance with the Institute of Electronic and Electrical Engineers (IEEE) 802.3 standard available from the IEEE, New York, N.Y., that can be used with the present invention. Frame 500 comprises a data field 540, a frame-check-sequence (FCS) field 550, and a link-layer-header field 570 containing destination address 510, source address 520, and length 530 fields. The destination 510 and source 520 address fields hold the link layer (MAC) addresses of a destination and source nodes, respectively. The data 540 and length 530 fields hold data and the amount of the data contained in the frame, respectively. The FCS field holds a cyclic-redundancy check (CRC) of the contents of the header 570 and data 540 fields.

Each node in network 200 is assigned an IP address and a MAC address that are used to communicate with the node at the network and link layers, respectively. If the IP address of a node is known, the MAC address of that node can be discovered using an address-resolution protocol, such as the Address Resolution Protocol (ARP) defined in Request For Comments (RFC) 826, which is available from the Internet Engineering Task Force (IETF) at http://www.ietf.org and is hereby incorporated by reference as though fully set forth herein. ARP uses broadcast messages to determine the MAC (hardware) address corresponding to a particular IP address. Specifically, a source node discovers the MAC address of a destination node by broadcasting a request ARP message containing the IP address of the destination node. The destination node, in turn, responds to the source node with a reply ARP message that contains the MAC address of the destination node. The source node can then use this MAC address to communicate with the destination node at the link layer.

FIG. 6 is a schematic block diagram of an ARP message that can be used with the present invention. Message 600 comprises a hardware-type field 605, protocol-type field 610, hardware-address-length field 615, protocol-address-length field 620, operation field 625, source-hardware-address field 630, source-protocol-address field 635, destination-hardware-address field 640, and destination-protocol-address field 645. The hardware-type field 605 holds a value that indicates the type of hardware address, e.g., Ethernet, contained in the source and destination hardware address fields 630, 640. Likewise, the protocol-type field 610 holds a value that indicates the type of protocol address, e.g., IP, contained in the source and destination protocol address fields 635, 645. The hardware and protocol address length fields hold values that indicate the length of the hardware and protocol addresses, respectively. The source hardware and protocol fields hold the link-layer and network-layer addresses of the source node, respectively. Likewise, the destination hardware and protocol address fields hold the link-layer and network-layer addresses of the destination node, respectively.

The present invention relates to a technique for forwarding packets received at an intermediate node over a hybrid network. The intermediate node has a first interface configured to accommodate a L2 connection and a second interface configured to accommodate a L3 connection. The intermediate node assigns a link-layer address to the second interface. Preferably, this link-layer address is allocated from a pool of such addresses associated with the second interface. Illustratively, link-layer packets received by the intermediate node having a destination address that matches the allocated link-layer address are L2 switched to the second interface. The packets are further processed and forwarded over the second interface. Likewise, packets received by the second interface are processed, including determining a destination of the packet and placing the allocated link-layer address in the source address field of the packet. The packet is then L2 switched towards its destination.

Figure 7:
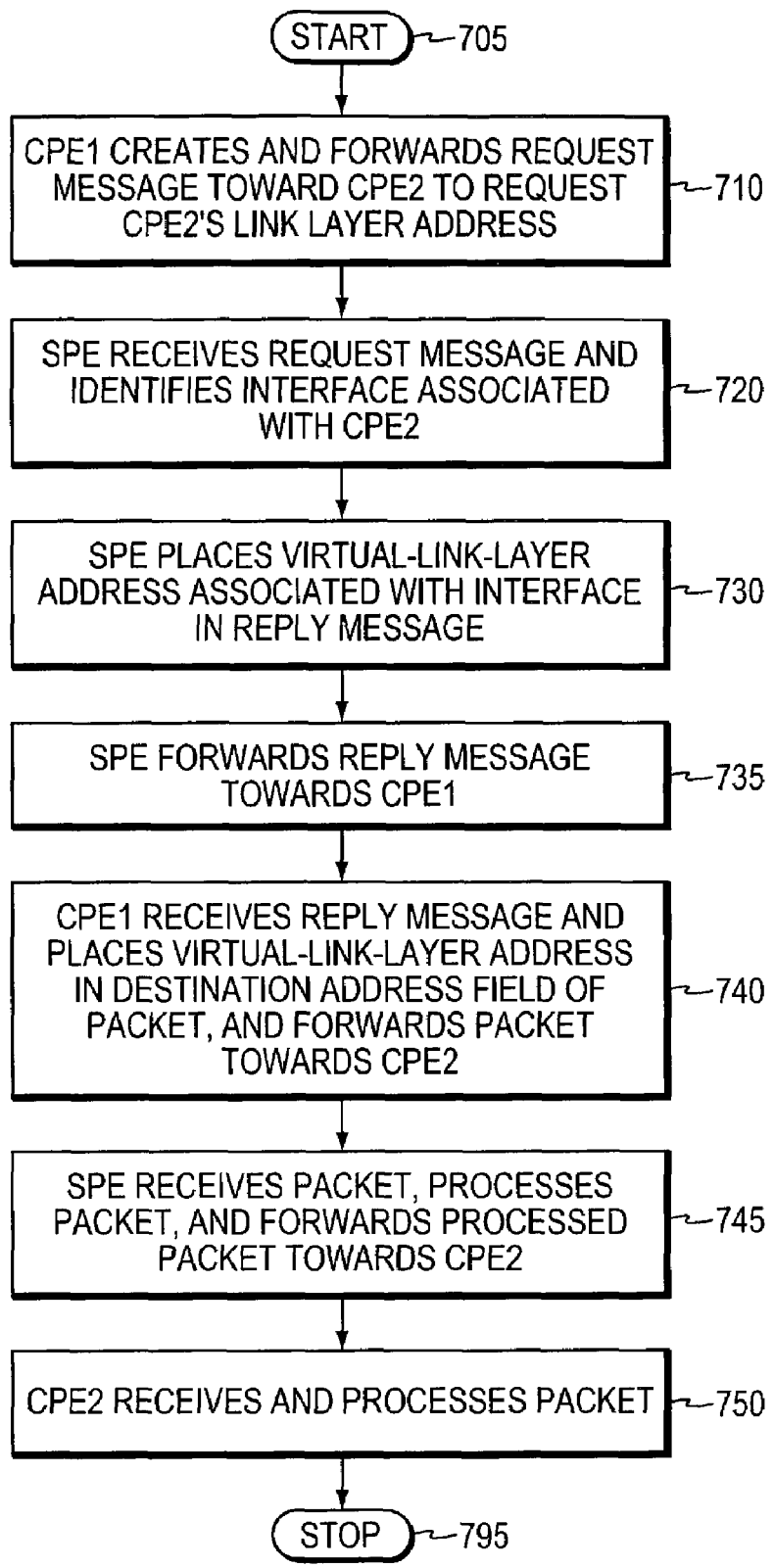
FIG. 7 is a flow diagram of a sequence of steps that can be used to transfer traffic from a bridged connection to a routed connection in accordance with the present invention.

FIG. 7 illustrates a sequence of steps that can be used to send a packet 500 from router 230a (FIG. 2) to router 230b in accordance with the inventive technique. Before router 230a can send a link-layer packet to router 230b, router 230a must learn (discover) router 230b's link-layer address. As described below, Steps 710 through 740 enable router 230a to learn the link-layer address of router 230b. It should be noted, however, that other techniques could be used, such as statically configuring router 230a with router 230b's link-layer address.

The sequence starts at Step 705 and proceeds to Step 710 where router (CPE1) 230a creates a request message 600 containing its IP and MAC addresses and the IP address of router (CPE2) 230b, and forwards the request message 600 towards CPE2 230b. Next at Step 720, SPE 300 receives and processes request message 600 including identifying the interface associated with CPE2 230b by applying CPE2's 230b IP address contained in message 600 to table 384 to locate an entry 400 that contains a network-layer address 435 that matches the IP address of CPE2 230b. SPE 300 then determines from the matching entry 400 that CPE2 230b can be reached through interface VC 270 and places the virtual-link-layer address 425 associated with VC 270 contained in the matching entry 400 into message 600 and forwards the message 600 as a reply message towards CPE1 230a, as indicated at Steps 730 and 735.

CPE1 230a receives the reply message 600, places the MAC address of VC 270 contained in the reply message 600 into the destination address field 510 of packet 500, and forwards packet 500 towards CPE2 230b as indicated at Step 740.

At Step 745, SPE 300 receives packet 500, processes it, and forwards it over connection 270 towards CPE2 230b. Specifically, SPE 300 L2 switches the packet by applying the destination address 510 in the header 570 to the forwarding table 386 to determine the interface (i.e., VC 270) where CPE2 230b can be reached. SPE 300 then removes the link-layer header from the packet, encapsulates the packet in accordance with RFC 2684 routed encapsulation, and forwards the packet over the interface (i.e., over VC 270) towards CPE2 230b. CPE2 230b then receives the packet and processes it, which may include decapsulating the packet and forwarding the packet onto LAN 220b (Step 750). The sequence ends at Step 795.

Figure 8:
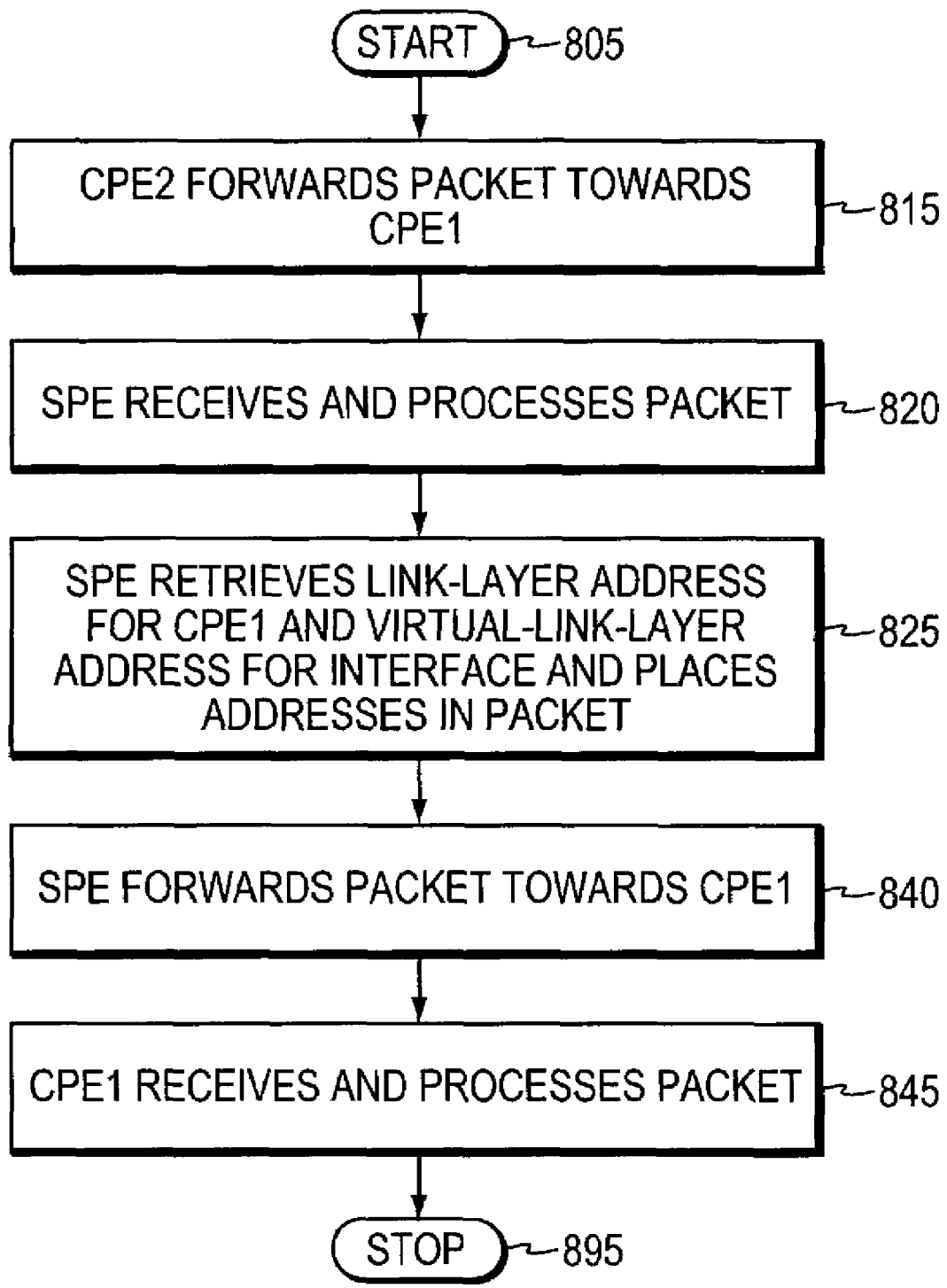
FIG. 8 is a flow diagram of a sequence of steps that can be used to transfer traffic from a routed connection to a bridged connection in accordance with the present invention.

FIG. 8 is a sequence of steps that can be used to transfer a packet 500 from CPE2 230b to CPE1 230a in accordance with the inventive technique. The sequence begins at Step 805 and proceeds to Step 815 where CPE2 230*b* processes packet 500, which includes removing the packet header 570 and encapsulating the packet in accordance with RFC 2684 routed encapsulation, and forwards the packet over VC 270 towards CPE2 230*b*. At Step 820, SPE 300 receives the packet and processes it including decapsulating the packet and adding a link-layer header 570 to the packet. Next at Step 825, SPE 300 locates the connection table entry 400 associated with VC 270 and retrieves the link-layer address 440 for destination node CPE1 230*a* and the virtual-link-layer address 425 associated with VC 270 from the entry 400 and places it in the destination-address field 510 and source-address field 520 of the packet, respectively. SPE 300 then processes the packet and forwards the packet towards its destination, i.e., CPE1 230*a*, as indicated at Step 840. Specifically, SPE 300 L2 switches the packet by applying the destination address 510 to the forwarding table 386 to determine the interface 235 where CPE1 230*a* can be reached and forwards the packet over that interface 235. CPE1 230*a* receives the packet and processes it, accordingly, which may include decapsulating the packet and forwarding it onto LAN 220*a* (Step 845). The sequence ends at Step 895.

The above-described embodiment of the invention of the invention includes a connection table 384 that contains one or more entries, where each entry 400 is associated with a connection. Moreover, each entry contains a virtual-link-layer address 425 associated with the connection. This is not intended to be a limitation of the invention. In other embodiments of the invention, other forms of interfaces are associated with the virtual-link-layer address 425. For example, in one embodiment, a physical port is associated with the virtual-link-layer address. Here, packets that specify the virtual-link-layer address as the destination address are forwarded to the port. Likewise, packets received from the port are processed to include the virtual-link-layer address as the source address of the packet.

Also it should be noted that in the above-described embodiment of the invention, information contained in the connection table is pre-configured, however, this too is not is intended to be a limitation of the invention. In other embodiments of the invention, information contained in the connection table is learned and the table is populated with the information, accordingly. For example, in one embodiment of the invention, the link-layer address of the node (e.g., CPE1 230*a*) connected to the bridged connection is learned when the node sends a packet to the intermediate node (e.g., SPE 300) configured to implement the present invention.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. In a computer network, a method for forwarding packets in an intermediate node comprising one or more interfaces, the method comprising the steps of:
   assigning a link-layer address to a second interface;
   receiving a packet on a first interface having a destination link-layer address that matches the link-layer address;
   encapsulating the packet; and
   forwarding the encapsulated packet over the second interface.

2. A method as defined in claim 1 wherein the second interface is a virtual connection.

3. A method as defined in claim 1 wherein the second interface is a port.

4. A method as defined in claim 1 wherein the link-layer address is allocated from a pool of addresses associated with the second interface.

5. A method as defined in claim 1 wherein the packet is encapsulated in accordance with the Multiprotocol Encapsulation Over ATM Adaptation Layer 5 protocol.

6. A method as described in claim 1 comprising the step of:
   removing a link-layer header from the packet.

7. A method as described in claim 1 comprising the step of:
   receiving a request message from a first node, the request message containing a network-layer address of a second node reachable through the second interface;
   placing the link-layer address assigned to the second interface in a reply message; and
   forwarding the reply message to the first node.

8. A method as described in claim 7 wherein the request message is an Address Resolution Protocol (ARP) request message.

9. A method as described in claim 7 wherein the reply message is an Address Resolution Protocol (ARP) reply message.

10. In a computer network, a method for forwarding packets in an intermediate node comprising one or more interfaces, the method comprising the steps of:
    assigning a link-layer address to a first interface;
    receiving an encapsulated packet on the first interface;
    decapsulating the packet;
    adding a link-layer header to the packet;
    placing the link-layer address in the link-layer header; and
    forwarding the packet over a second interface.

11. A method as defined in claim 10 wherein the link-layer address is placed in a source address field contained in the link-layer header.

12. A method as defined in claim 10 wherein the packet is decapsulated in accordance with the Multiprotocol Encapsulation Over ATM Adaptation Layer 5 protocol.

13. A method as defined in claim 10 wherein the step of forwarding the packet over a second interface comprises the step of:
    forwarding the packet to a destination.

14. An apparatus adapted to forward packets, the apparatus comprising:
    a second interface having a link-layer address that is assigned to the second interface;
    a first interface configured to receive a packet containing a destination link-layer address that matches the link-layer address; and
    a processor configured to encapsulate the packet and forward the packet over the second interface.

15. An apparatus as in claim 14 comprising:
    a data structure configured to hold one or more entries wherein each entry is associated with an interface and contains the link-layer address assigned to the interface.

16. An apparatus as in claim 14 wherein the second interface is configured to receive an encapsulated packet and the processor is configured to decapsulate the packet, add a link-layer header to the decapsulated packet and place the link-layer address in the link-layer header, and the first interface is configured to forward the decapsulated packet.

17. An apparatus for forwarding packets comprising:
means for assigning a link-layer address to a second interface;
means for receiving a packet on a first interface having a destination link-layer address that matches a link-layer address assigned to the second interface;
means for encapsulating the packet; and
means for forwarding the encapsulated packet over the second interface.

18. An apparatus for forwarding packets comprising:
means for assigning a link-layer address to a first interface;
means for receiving an encapsulated packet from the first interface;
means for decapsulating the packet;
means for adding a link-layer header to the packet;
means for placing the link-layer address in the link-layer header; and
means for forwarding the packet over a second interface.

19. A computer readable medium containing computer executable instructions for forwarding a packet, the executable program instructions comprising computer executable instructions for:
assigning a link-layer address to a second interface;
receiving a packet on a first interface having a destination link-layer address that matches the link-layer address;
encapsulating the packet; and
forwarding the encapsulated packet over the second interface.

20. A computer readable medium containing computer executable instructions for forwarding a packet, the executable program instructions comprising computer executable instructions for:
assigning a link-layer address to a first interface;
receiving an encapsulated packet from the first interface;
decapsulating the packet;
adding a link-layer header to the packet;
placing the link-layer address in the link-layer header;
forwarding the packet over a second interface.

* * * * *

UNITED STATES PATENT AND TRADEMARK OFFICE
CERTIFICATE OF CORRECTION

PATENT NO. : 7,327,722 B1 Page 1 of 1
APPLICATION NO. : 10/293081
DATED : February 5, 2008
INVENTOR(S) : Matthew Pipher It is certified that error appears in the above-identified patent and that said Letters Patent is hereby corrected as shown below:

Col. 3, Line 54, please replace "allocated is link-layer" with "allocated link-layer"

Col. 9, Line 42, please replace "is intended to be" with "intended to be"

Signed and Sealed this

Twenty-third Day of November, 2010

David J. Kappos
*Director of the United States Patent and Trademark Office*